United States Patent
Satori

(10) Patent No.: US 7,593,629 B2
(45) Date of Patent: Sep. 22, 2009

(54) ZOOM LENS AND ELECTRONIC IMAGING SYSTEM USING THE SAME

(75) Inventor: Tomoyuki Satori, Kawagoe (JP)

(73) Assignee: Olympus Corporation, Tokyo (JP)

( * ) Notice: Subject to any disclaimer, the term of this patent is extended or adjusted under 35 U.S.C. 154(b) by 492 days.

(21) Appl. No.: 11/235,722

(22) Filed: Sep. 27, 2005

(65) Prior Publication Data

US 2006/0067662 A1 Mar. 30, 2006

(30) Foreign Application Priority Data

Sep. 29, 2004 (JP) ............................. 2004-284080

(51) Int. Cl.
*G03B 17/00* (2006.01)
(52) U.S. Cl. .......................................... 396/72; 396/85
(58) Field of Classification Search ................... 396/72, 396/76, 79, 85; 348/335, 344, 345; 359/676, 359/677, 679, 684

See application file for complete search history.

(56) References Cited

U.S. PATENT DOCUMENTS

| | | | |
|---|---|---|---|
| 3,658,411 A * | 4/1972 | Price .......................... | 359/686 |
| 4,246,148 A | 1/1981 | Shimp et al. | |
| 6,333,823 B1 | 12/2001 | Ozaki et al. | |
| 6,927,920 B2 * | 8/2005 | Nagata ........................ | 359/677 |
| 7,170,558 B2 * | 1/2007 | Yokota et al. ............... | 348/337 |
| 2004/0095503 A1 * | 5/2004 | Iwasawa et al. ............. | 348/344 |
| 2006/0017834 A1 * | 1/2006 | Konno et al. ................ | 348/335 |
| 2006/0262420 A1 * | 11/2006 | Matsumoto et al. ......... | 359/676 |

FOREIGN PATENT DOCUMENTS

| | | |
|---|---|---|
| JP | 10-020191 | 1/1998 |
| JP | 2002-169088 | 6/2002 |
| JP | 2004-037967 | 2/2004 |

* cited by examiner

*Primary Examiner*—Rodney E Fuller
(74) *Attorney, Agent, or Firm*—Kenyon & Kenyon LLP

(57) ABSTRACT

In an expensive zoom lens that has a zoom ratio of as high as about 5 and high optical performance and is very thin in its depth direction, the optical path of the optical system is easily bendable by reflecting optical members. The zoom lens includes a plurality of lens groups G1 to G5, and has a lens group F (G1) located nearest to the object side thereof. The first optical path bending is carried out by the first reflecting optical member PR located in the lens group F, and the second optical path bending is carried out by the second reflecting optical member RM located on an image side of the zoom lens with respect to the lens group F in a direction different from the first optical path bending direction. The lens group F remains substantially fixed with respect to an image plane I during zooming.

20 Claims, 11 Drawing Sheets

ZOOM LENS AND ELECTRONIC IMAGING SYSTEM USING THE SAME

This application claims benefits of Japanese Application No. 2004-284080 filed in Japan on Sep. 29, 2004, the contents of which are incorporated herein by this reference.

BACKGROUND OF THE INVENTION

The present invention relates generally to a zoom lens and an electronic imaging system using the same, and more particularly to a less costly electronic imaging system inclusive of video or digital cameras, the depth dimension of which is diminished by providing some contrivance to an optical system portion such as a zoom lens, and which ensures zoom ratios high enough to cover a wide focal length range from a wide-angle end to a telephoto end.

In recent years, digital cameras (electronic cameras) have received attention as the coming generation of cameras, an alternative to silver-halide 35 mm-film (135 format) cameras. Currently available digital cameras are broken down into some categories in a wide range from the high-end type for commercial use to the portable low-end type. In view of the category of the portable low-end type in particular, the primary object of the present invention is to provide the technology for implementing easy-to-use, high-zoom-ratio, less costly video or digital cameras whose depth dimension is reduced while high image quality is ensured, and which have zoom ratios high enough to cover a wide focal length range from a wide-angle end to a telephoto end.

The gravest bottleneck in diminishing the depth dimension of cameras is the thickness of an optical system, especially a zoom lens system from the surface located nearest to its object side to an image pickup plane. To make use of a collapsible lens mount that allows the optical system to be taken out of a camera body for taking and received therein for carrying now becomes mainstream.

However, the use of the collapsible lens mount is not preferable in view of ease of operation, because much time is taken for sending the zoom lens received at it ready for use. Making the lens group nearest to the object side movable is again not preferable for prevention of entrance of moisture and dust.

More recent years have seen a camera version that takes no waiting time for sending it ready for use (for booting a zoom lens up), works favorably for prevention of entrance of moisture and dust and is much more slimmed down in its depth direction by use of an optical system with an optical path bent by a reflecting optical member such as a mirror or a prism. In a typical camera of this version, the lens group nearest to the object side of the zoom lens is fixed in terms of position and the reflecting optical member is received in that lens group, so that the subsequent optical path is bent longitudinally or transversely with respect to a camera body, thereby reducing the depth-direction dimension as much as possible.

For the time being, most video or digital cameras under the portable category to which the invention is directed would have a zoom ratio of about 3; however, cameras having a zoom ratio of as high as about 5 will come out anyway.

Still, a problem with an increased zoom ratio is that even with an optical path-bent zoom optical system, any compact imaging system cannot be set up, because the amount of movement of lens groups for zooming becomes too large, resulting in size increases in the optical path-bent direction.

For instance, Patent Publication 1 discloses a zoom lens relying on an optical path-bent optical system with a zoom ratio of about 5. However, this zoom lens, albeit having a zoom ratio of as high as about 5, has demerits of using some considerable lenses and being costly, because of a complicated lens contraption comprising six lens groups.

For instance, Patent Publications 2, 3, 4 and 5 disclose an arrangement wherein an optical path is bent by a reflecting optical member located at or between lens groups positioned in the rear of the lens group located nearest to the object side. However, a problem with this is that the depth-direction thickness is hardly reduced after optical path-bending because of an increased distance from the entrance surface to the optical path-bending reflecting optical member.

In addition, a mere combination of the optical path bending relying on a reflecting optical system located in the lens group nearest to the object side as in Patent Publication 1 with that relying upon a reflecting optical member located at or between lens groups in the rear of the lens group located nearest to the object side as in Patent Publications 2, 3, 4 and 5 would not always lead to high-zoom-ratio, compact arrangements.

Patent Publication 1
JP (A) 2004-37967
Patent Publication 2
JP(A)10-20191
Patent Publication 3
JP(A)2000-187159
Patent Publication 4
JP(A)2000-187160
Patent Publication 5
JP(A)2002-169088

SUMMARY OF THE INVENTION

In consideration of such problems with the prior art as briefed above, the primary object of the invention is to provide a zoom lens that is easy to ensure higher zoom ratios, has more improved optical performance, and is much more reduced in its depth-direction thickness, and an electronic imaging system incorporating it.

According to the invention, this object is accomplished by the provision of a zoom lens having a plurality of lens groups, comprising:

a lens group F located nearest to an object side thereof;

a first reflecting optical member for bending an optical path to a first direction located in said lens group F; and a second reflecting optical member for bending the optical path to a second direction which is different from the first direction, the second reflecting optical member being located on an image side with respect to said lens group F, wherein said lens group F remains substantially fixed with respect to an image plane during zooming.

The invention also provides an electronic imaging system, comprising a zoom lens as recited in claim 1 and an electronic image pickup device for producing an image formed through said zoom lens as image data, wherein a shape of the image data is capable of being changed by processing the image data, and said zoom lens satisfies the following condition (4) upon focusing on a substantially infinite object point:

$$0.75 < y_{07}/(f_w \cdot \tan \omega_{07w}) < 0.97 \qquad (4)$$

where $y_{10}$ is a distance (maximum image height) from the center to the farthest point in an effective image pickup plane of the electronic image device, $y_{07}$ is represented as $y_{07}=0.7y_{10}$, and $\omega_{07w}$ is an angle with an optical axis in a direction of an object point corresponding to an image point formed at a position of $y_{07}$ from the center on the effective image pickup plane of the electronic image pickup device at the wide-angle end.

Still other objects and advantages of the invention will in part be obvious and will in part be apparent from the specification.

The invention accordingly comprises the features of construction, combinations of elements, and arrangement of parts that will be exemplified in the construction hereinafter set forth, and the scope of the invention will be indicated in the claims.

DESCRIPTION OF THE PREFERRED EMBODIMENTS

Figure 1:
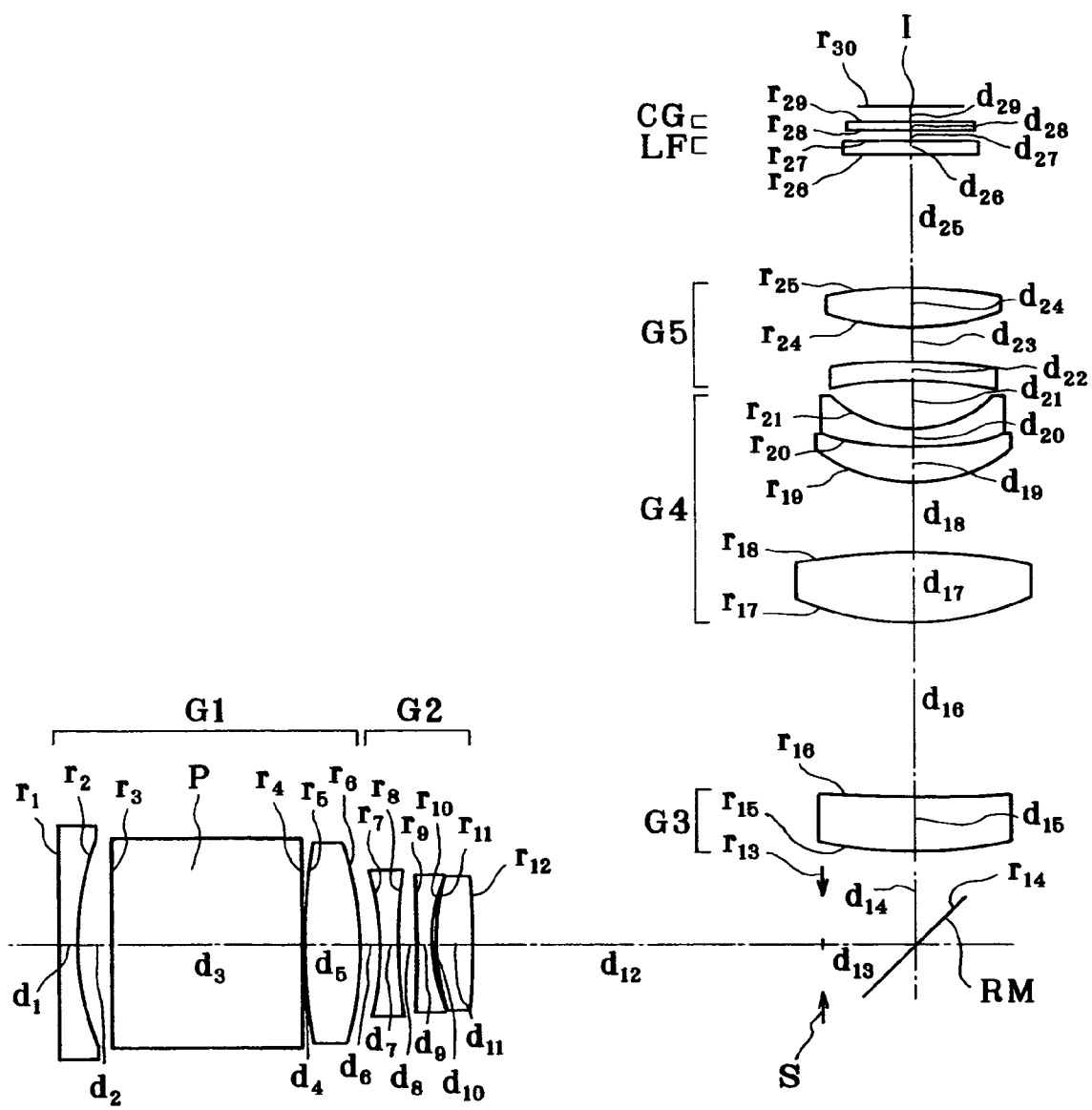
FIG. 1 is illustrative in lens arrangement section of Example 1 of the zoom lens of the invention at the wide-angle end upon focusing on an object point at infinity.

The advantage of, and the requirement for, the arrangement as recited above is now explained.

Such an arrangement ensures a compact imaging system, because an optical path bending is bent to a first direction by the first reflecting optical member located in the lens group F nearest to the object side of the zoom lens so that the imaging system can be slimmed down in its depth direction, and the optical path is bent to a second direction, which is different from the first direction, by the second reflecting optical member located on the image side of the zoom lens with respect to the lens group F so that the size of the imaging system can be prevented from increasing in the first direction.

Referring to the first and second directions, for instance, the first direction could be a longitudinal direction with respect to a camera body and the second direction could be a transverse direction with respect thereto, and vice versa.

The substantial fixation of the lens group nearest to the object side of the zoom lens with respect to the image plane during zooming can instantaneously send the camera ready for use (with no waiting time for booting the zoom lens up), and works favorably for prevention of entrance of moisture and dust.

With an arrangement wherein the optical path is bent twice as in the invention, the overall length of the zoom lens would become long due to the need of securing bending space. As a result, it would difficult to keep the height of light rays low all the way from an entrance surface to an image pickup plane. This in turn would offer some problems; that is, the size of a lens barrel unit would become large, and there would be a shortage of the quantity of light at the peripheral portion of a screen. In addition, it would often be impossible to bend the optical path to the first direction by the lens group F.

In the invention, therefore, some contrivances are applied in such a way as to make the overall lens system compact, as described below.

The zoom lens of the invention should preferably satisfy the following condition (1) with respect to the space for receiving the second reflecting optical member.

$$1.0 < D/f_w < 4.0 \tag{1}$$

Here D is an air space at which a space between a lens group just on an object side of the second reflecting optical member and a lens group on an image side of the second reflecting optical member becomes the narrowest, and $f_w$ is a focal length of the zoom lens at a wide-angle end thereof.

As the upper limit of 4.0 to condition (1) is exceeded, it cause the space for receiving the second reflecting optical system to becomes too large, resulting in an increase in the total length of the zoom lens and, hence, in the size of an associated camera. As the lower limit of 1.0 to condition (1), it causes the second reflecting optical member to interfere with the lens groups before and after it.

More preferably, $$1.3 < D/f_w < 3.5 \tag{1'}$$

Most preferably, $$1.6 < D/f_w < 3.0 \tag{1''}$$

On an image side of the zoom lens with respect to the lens group F, there are further a lens group VF that has negative power and moves in such a way as to be positioned nearer to the image side at the telephoto end than at the wide-angle end upon zooming and a lens group VR that is positioned on an image side of the zoom lens with respect to the lens group VF, has positive power and moves in such a way as to be positioned nearer to the object side at the telephoto end than at the wide-angle end upon zooming, so that both the lens groups VF and VG can have a zooming function to achieve high zoom ratios. Then, to make the zooming function efficient and ensure compactness, the lens group VF should preferably satisfy the following condition (2) with respect to power.

$$0.8 < |f_2/f_w| < 4.0 \tag{2}$$

Here $f_2$ is the focal length of the lens group VF, and $f_w$ is the focal length of the zoom lens at the wide-angle end.

As the upper limit of 4.0 to this condition (2) is exceeded, it causes the power of the lens group VF to become too weak, resulting in an increased amount of its movement for zooming. This then causes the height of light rays to tend to grow on the image plane side of the zoom lens especially at the wide-angle end, resulting possibly in an increase in the size of the second reflecting optical member and the inability to bend the optical path to the second direction. As the lower limit of 0.8 is not reached, it causes the paraxial image-formation magnification of the lens group VF to become low, again resulting in an increased amount of its movement for zooming, and rendering correction of aberrations difficult as well.

More preferably, $$1.0<|f_2/f_w|<3.5 \tag{2'}$$

Most preferably, $$1.2<|f_2/f_w|<2.5 \tag{2''}$$

For the same reason as is the case with the lens group VF, it is also preferable for the lens group VR to satisfy the following condition (3).

$$0.8<|f_4/f_w|<4.0 \tag{3}$$

Here $f_4$ is the focal length of the lens group VR, and $f_w$ is the focal length of the zoom lens at the wide-angle end.

More preferably, $$2.4<|f_4/f_w|<5.5 \tag{3'}$$

Most preferably, $$4.0<|f_4/f_w|<5.0 \tag{3''}$$

In the zoom lens of the invention, the height of light rays in the lens group nearest to the object is kept as low as possible so as to bend the optical path to the first direction. To this end, a negative lens of stronger power must be located at the entrance surface, making distortion likely to occur. If distortion is acceptable, however, it is then possible to diminish the optical path-bending reflecting optical member in the first lens group, because of a decrease in the height of incidence light rays relative to the angle of view. In the invention, therefore, barrel distortion is produced so intentionally that image distortion by the distortion produced at the optical system is corrected using a function of processing and shaping image data obtained by taking an image formed through that zoom lens with an electronic image pickup device. In particular, it is ideal to produce an image from an electronic imaging device such as a camera in the form of already corrected image data. In this conjunction, the optical system should preferably satisfy the following condition (5) with respect to the distortion of that zoom lens upon focusing on a substantially infinite object point.

$$0.75<y_{07}/(f_w \cdot \tan \omega_{07w})<0.97 \tag{4}$$

where $y_{10}$ is a distance (maximum image height) from the center to the farthest point in an effective image pickup plane of the electronic image device, $y_{07}$ is represented as $y_{07}=0.7y_{10}$, and $\omega_{07w}$ is an angle with an optical axis in a direction of an object point corresponding to an image point formed at a position of $y_{07}$ from the center on the effective image pickup plane of the electronic image pickup device at the wide-angle end.

Condition (4) having a value of about 1 exceeding the upper limit of 0.97 means that distortion is optically well corrected. However, this also means that it is difficult to capture images over a wide angle-of-view range while the optical system is kept small. As the lower limit of 0.75 is not reached, it causes a noticeable deterioration in the sharpness of the peripheral portion of an image when image distortion by reason of the distortion of the optical system is corrected by image processing, because of too high an enlarging magnification of the peripheral portion of the image in the radial direction.

More preferably, $$0.80<y_{07}/(f_w \cdot \tan \omega_{07w})<0.96 \tag{4'}$$

Most preferably, $$0.85<y_{07}/(f_w \cdot \tan \omega_{07w})<0.95 \tag{4''}$$

The lens group F located nearest to the object side of the zoom lens is now explained at great length.

The lens group F could have either positive or negative power. For that lens group, however, it is preferable to have positive power. This is because even a decreased F-number makes it difficult for the diameter of an aperture stop to become large, so that the overall zoom lens hardly becomes large in its diametrical direction, correction of various aberrations inclusive of spherical aberration is easily achievable, and optical performance can be easily ensured at an increased zoom ratio.

To achieve size reductions that are the object of the invention by meeting a physical requirement for bending the optical path in the lens group F located nearest to the object side, diminishing the size and thickness of the first optical path-bending reflecting optical member and avoiding an increase in the diameter and size of each of the optical elements that form the lens group F, it is important that the entrance pupil position be as shallow with respect to the entrance surface as possible. For this purpose, it is necessary to construct the lens group F arrangement of, in order from its object side, a negative lens component, a first optical path-bending reflecting optical element and a positive lens component and make the powers of the negative and positive components as strong as possible. It is then preferred to satisfy the following conditions (5) and (6).

$$0.8<|f_{1n}|/\sqrt{(f_w \times f_t)}|<3.0 \tag{5}$$

$$0.8<f_{1p}/\sqrt{(f_w \times f_t)}<3.0 \tag{6}$$

Here $f_{1n}$ is the focal length of the negative lens component in the lens group F, $f_{1p}$ is the focal length of the positive lens component in the lens group F, $f_w$ is the focal length of the zoom lens at the wide-angle end, and $f_t$ is the focal length of the zoom lens at the telephoto end.

As the upper limits of 3 to both conditions (5) and (6) are exceeded, it causes the entrance pupil position to remain deep and the diameter and size of each of the optical elements that form the lens group F to increase, rendering it difficult to meet the physical requirement for bending the optical path. As the lower limit of 0.8 to each condition, it causes the powers of the negative and positive components in the lens group F to become too strong, resulting in an increased sensitivity of both to performance degradation due to their relative decentration. It also renders off-axis aberrations likely to occur to such an extent that they are hardly corrected.

It is more preferable to satisfy at least one of the following conditions (5') and (6').

$$0.9<|f_{1n}|/\sqrt{(f_w \times f_t)}|<2.5 \tag{5'}$$

$$0.9<f_{1p}/\sqrt{(f_w \times f_t)}<2.5 \tag{6'}$$

It is most preferable to satisfy at least one of the following conditions (5″) and (6″).

$$1.0 < |f_{1n}|/\sqrt{(f_w \times f_t)}| < 2.0 \tag{5″}$$

$$1.0 < f_{1p}/\sqrt{(f_w \times f_t)} < 2.0 \tag{6″}$$

In order to make the entrance pupil position shallow, it is necessary to reduce the number of optical elements as far as the aperture stop as much as possible. The location of more lenses on the object side with respect to the first optical path-bending optical member in the lens group F means that when the optical path is bent, the thickness of the lens group F in the depth direction does not become small. In the examples of the invention given later, therefore, the negative lens component, and the positive lens component in the lens group F is composed of a single lens.

For correction of aberrations produced within the lens group F, it is preferable to apply a concave surface to the image-side surface of the negative lens located in the lens group F and nearest to its object side and locate an aspheric surface thereat. This is particularly effective for correction of astigmatism. Also, because the curvature of that surface can be weakened, performance deterioration due to fabrication errors is much more limited, contributing to thickness reductions in the depth direction.

The lens group F should preferably satisfy the following condition (7) with respect to power.

$$1.5 < f_1/f_w < 7.5 \tag{7}$$

Here $f_1$ is the focal length of the lens group F, and $f_w$ is the focal length of the zoom lens at the wide-angle end.

Exceeding the upper limit of 7.5 to condition (7) renders correction of off-axis aberrations and chromatic aberrations difficult. Falling short of the lower limit of 1.5 causes the paraxial magnification of the lens group VF to become low upon zooming, and the zooming ratio to tend to become low relative to the amount of its movement.

More preferably, $$2.0 < f_1/f_w < 6.5 \tag{7'}$$

Most preferably, $$3.0 < f_1/f_w < 5.5 \tag{7″}$$

The first optical path-bending reflecting optical member in the lens group F could be formed of either a prism or a mirror, although the use of the prism is most preferable for thickness reductions in the depth direction. The d-line refractive index of the prism medium is preferably high, more preferably at least 1.70, and even more preferable at least 1.80. While, in the examples of the invention given later, the lens group F located nearest to the object side of the zoom lens is made up of a negative lens and a prism in order from its object side, it is understood that if there is used a power prism having a negative spherical or aspheric refracting surface located at its entrance surface, it is not necessary to locate an independent negative component on the object side of the zoom lens with respect to the entrance surface of the prism.

The lens group VF is now explained in more details.

For the lens group VF, too, the number of parts as far as the aperture strop should preferably be minimized so as to make the entrance pupil position shallow, as is the case with the lens group F. In order for the lens group VF to have negative refracting power while the number of parts as far as the aperture stop is minimized, it is made up of two negative lenses and one positive lens, three in all, in the examples given later. The lens group VF, because of taking on zooming, has large negative power, and two negative lenses are located for power dispersion. To ensure that negative power with a minimum of lenses, a double-concave lens is used as the negative lens located in the lens group VF and nearest to its object side. Further, the location of one positive lens helps prevent a Petzval's sum from becoming worse and makes correction for off-axis various aberrations. If any of the negative lenses is cemented to the positive lens into a doublet, it then works for correction of chromatic aberrations. If a vitreous material having an Abbe constant of at least 70 is used for the positive lens to be cemented, it works well for correction of chromatic aberrations. An Abbe constant of 80 or greater is desired.

As mentioned above, the lens group VF, because of taking on zooming, has strong power and so is susceptible of large aberration fluctuations with zooming. To keep satisfactory performance all over the zoom range, therefore, it is required to remove aberrations within the lens group VF. Preferably to this end, an aspheric surface is applied to the image-side concave surface of the negative lens located in the lens group VF and nearest to its object side. This is particularly effective of correction of astigmatism.

The lens group VR is now explained in more details.

In the invention, the lens group VR is allowed to have a zooming function by designing it to move in such a way as to be positioned nearer to the object side at the telephoto end than at the wide-angle end. With a bending optical system such as one contemplated herein, however, an image point formed by a combined system of the lens groups F and VF, i.e., an object point with respect to a combined system of the lens group VR and the subsequent group(s) is likely to come close to the subject side. This in turn causes the magnification of a combined system of the lens group VR and the subsequent groups to tend to become low, rendering it more difficult to obtain high magnifications relative to the movement of the lens group VR. In the examples of the invention given later, therefore, the internal arrangement of the lens group VR has ++-construction, in order from its object side, such that the power of the lens group VR becomes as strong as possible and the principal points are positioned as close to the object side as possible. In view of correction of aberrations, the positive lens and the negative lens should preferably be cemented together into a doublet. This is effective for correction of axial and off-axis chromatic aberrations. If at least one aspheric surface is applied to any of the lens surfaces that form this lens group, it works for correction of spherical aberrations and coma.

Further, the lens groups VF and VR should preferably satisfy the following conditions (8) and (9).

$$1.2 < \beta_{VF} < 6.5 \tag{8}$$

$$1.2 < \beta_{VR} < 6.5 \tag{9}$$

Here $\beta_{VF}$ is represented as the (magnification of the lens group VF at the telephoto end)/(magnification of the lens group VF at the wide-angle end), and $\beta_{VR}$ is represented as the (magnification of the lens group VR at the telephoto end)/(magnification of the lens group VR at the wide-angle end).

Reference is now made to condition (8). As the upper limit of 6.5 is exceeded, it causes too excessive a zooming load on the lens group VF upon zooming, which may otherwise cause aberrations occurring in the lens group VF to become too large to correct. As the lower limit of 1.2 is not reached, the zooming action of the lens group VF becomes weak and too excessive a zooming load is applied on the lens group VR upon zooming, resulting in aberrations occurring in the lens group VR becoming too large to correct. At the wide-angle end in particular, there is possibly a rise in the height of light rays on the image plane side with respect to the lens group VF, which may otherwise result in an increase in the size of the second reflecting optical member to become large, and the inability to carry out the second optical path bending.

Reference is now made to condition (9). As the upper limit of 6.5 is exceeded, it causes too excessive a zooming load on the lens group VR upon zooming, which may otherwise cause aberrations occurring in the lens group VR to become too large to correct. As the lower limit of 1.2 is not reached, the zooming action of the lens group VR becomes weak and too excessive a zooming load is applied on the lens group VF upon zooming, resulting in aberrations occurring in the lens group VF becoming too large to correct.

It is more preferable to satisfy at least one of the following conditions (8') and (9').

$$1.6 < \beta_{VF} < 5.5 \tag{8'}$$

$$1.6 < \beta_{VR} < 5.5 \tag{9'}$$

It is most preferable to satisfy at least one of the following conditions (8") and (9").

$$2.0 < \beta_{VF} < 4.5 \tag{8"}$$

$$2.0 < \beta_{VR} < 4.5 \tag{9"}$$

In order to ensure the performance of the optical system, it is preferable to locate a lens group R on an image size of the zoom lens with respect to the lens group VR. The lens group R has a role of making the angle of light rays incident on the electronic image pickup device proper. This lens group may have either positive or negative power. As the lens group R has negative power, it can lower the height of light ray throughout the zoom lens system, so that even when its depth-direction thickness is diminished upon bending of the optical path, there is no or little shading of rim light beams with the result that a sufficient quantity of light can be ensured at the peripheral portion of the screen. The lens group R could be movable so as to increase the degree flexibility in correction of aberrations. In consideration of the role of making the angle of light rays incident on the electronic image pickup device proper, however, the lens group R could be fixed with respect to the image plane during zooming.

The lens group R should preferably satisfy the following conditions (10) and (11) with respect to power.

$$0.6 < |f_5/f_w| < 20 \tag{10}$$

$$0.1 < |f_5/f_t| < 6.0 \tag{11}$$

Here $f_5$ is the focal length of the lens group R, $f_w$ is the focal length of the zoom lens at the wide-angle end, and $f_t$ is the focal length of the zoom lens at the telephoto end.

The lens group R could be used as a focusing group. As the upper limits of 20 and 5.0 to conditions (10) and (11), respectively, are exceeded, it causes an increase in the amount of movement of the fifth lens group (lens group R) that acts as the focusing group upon focusing from infinity to a nearby object point; it works against compactness. As the lower limits of 0.6 and 0.1, respectively, are not reached, it causes an increase in the angle of incidence of off-axis light rays on the electronic image pickup device, which otherwise results in shading of brightness at the peripheral portion of the screen that is peculiar to a CCD or other electronic image pickup device.

More preferably, at least one of the following conditions (10') and (11') should be satisfied.

$$1.3 < |f_5/f_w| < 15.0 \tag{10'}$$

$$0.4 < |f_5/f_t| < 4.0 \tag{11'}$$

Most preferably, at least one of the following conditions (10") and (11") should be satisfied.

$$2.0 < |f_5/f_w| < 10.0 \tag{10"}$$

$$0.7 < |f_5/f_t| < 2.0 \tag{11"}$$

For far more effective size reductions by bending the optical path, it is preferable to interpose a lens group M of positive power between the lens group VF and the lens group VR. As mentioned above, the lens group M should preferably have positive power. This in turn helps keep the height of light rays at the following lens groups so low that even when the optical path is bent for depth-direction thickness reductions, there is no or little shading of rim light beams and, hence, decreases in the quantity of light at the peripheral portion of the screen can be minimized. For this lens group that has a chief action on lowering the height of light rays at the following lens groups, one positive lens suffices. It is understood that two or more lenses are used for active correction of aberrations, but they work against cost and spacing savings. When the lens group M is made up of a positive single lens, it should preferably be in a meniscus form convex on its object side, because the principal points can come so close to the object side that it is easy to increase the paraxial image-formation magnification at the lens group M and the following lens groups. While the substantial fixation of the lens group M with respect to the image plane during zooming works for space and cost savings because of a decrease in the number of parts such as a lens drive actuator, it is acceptable to make the lens group M movable.

Reference is now made to the aperture stop.

The aperture stop should preferably be interposed between the lens group VF and the lens group VR. At such a site, the diameter of the aperture is less likely to increase and the height of light rays becomes relatively low; the space for receiving a shutter actuator, a stop blade or the like is easily secured.

The aperture stop could be either fixed in terms of position or movable with the moving group as one integral piece. In the example of the invention described later, the aperture stop remains substantially fixed with respect to the image plane. This dispenses with any space through which the stop, the shutter actuator, etc. move, making dead space less likely to occur in a lens barrel unit and making it easy to ensure space for the location of other members such as a lens driving actuator. Alternatively, the stop could be designed to move in unison with the moving lens group and is positioned nearer to the object side at the wide-angle end than at the telephoto end. For instance, the stop could be movable together with the lens group M or the lens group VR during zooming. Accordingly, the stop is moved to the object side at the wide-angle end, so that the entrance pupil position can be kept shallow. This in turn permits the height of light rays in the lens group F nearest to the object side to be kept so low that the bending of the optical path can be facilitated with effective prevention of an increase in the diameter of the front lens.

With such lens arrangements as described above, the height of light rays at the lens group F nearest to the object side can be so lowered that it becomes possible to bend the optical path to the first direction by the lens group F. Further, on an image plane side with respect to the lens group VR, the angles of both axial and off-axis light rays with the optical axis can become so small that the second optical path-bending reflecting optical member can be diminished and slimmed down, working for bending the optical path twice. Although bending of the optical path to the second direction by the second reflecting optical member could be carried out at the optimum position determined depending on the location of parts such as electric substrates, batteries and a strobe, the internal layout of a camera casing, camera design and all that, yet it should preferably be done on an image plane side with respect to the aperture stop. This is because, as described above, light rays hardly gain height on the image plane side with respect to the aperture stop, making it easy to reduce the size and thickness of the second reflecting optical member. An attempt to ensure the space for bending the optical path to the second direction on an object side with respect to the aperture stop causes the distance from the lens group F nearest to the object side to the aperture stop to become long. This in turn renders it difficult to keep the entrance pupil shallow, which may otherwise render bending of the optical path to the first direction by he lens group F difficult and the diameter of the front lens too large. In this regard, too, it is preferable to bend the optical path to the second direction in the image plane side with respect to the aperture stop. The second optical path-bending reflecting optical member could be located in one lens group rather than between it and the adjacent lens group. For the reflecting optical member for bending the optical path to the second direction, a mirror or a prism could be used. For this prism, it is acceptable to use a power prism with a spherical or aspheric surface applied at the entrance or exit surface.

Reference is now made to focusing.

With the object of the invention in mind, it is preferable to keep the lens group F fixed, and with the construction of the invention, the paraxial image-formation magnification of the lens group VF is likely to become an erratic −1. Thus, focusing should preferably be carried out by a part or all of the lens groups located on the image side of the zoom lens with respect to the lens group VF. Focusing could be performed by any one of the lens groups; however, the use of the groups that move for zooming as the focusing group is favorable in consideration of space and cost requirements, because the actuator for driving the zooming lens groups can also be used for the driving of focusing or it is unnecessary to provide a separate actuator for the driving of focusing.

By the way, the zoom lens of the invention should preferably satisfy the following condition (12).

$$3.5 < f_t/f_w < 10.0 \quad (12)$$

Here $f_w$ is the focal length of the zoom lens at the wide-angle end, and $f_t$ is the focal length of the zoom lens at the telephoto end.

As the upper limit of 10 to condition (12) is exceeded, it renders it impossible to set up any compact imaging system, because an increased zoom ratio causes the amount of movement of the lens groups that move for zooming to become too large. As the lower limit of 3.5 is not reached, the object of the invention is achievable even with an arrangement of simpler construction than in the invention.

More preferably, $$4.0 < f_t/f_w < 8.0 \quad (12')$$

Most preferably, $$4.5 < f_t/f_w < 6.0 \quad (12'')$$

As can be seen from the explanations given above, the present invention can successfully provide a zoom lens that can instantaneously send a camera ready for use (with no waiting time for boosting the zoom lens up) as is not the case with a collapsible lens mount camera, and is preferable for prevention of entrance of moisture and dust. With the arrangement of the invention, the optical path (optical axis) of the optical system can be easily bent by means of a reflecting optical member such as a prism so that a camera, when the zoom lens of the invention is applied to it, can be much more reduced in terms of depth-direction thickness. Further, that zoom lens has a zoom ratio of as high as about 5 and improved optical performance, is very thin in the depth direction, and costs less.

Figure 2:
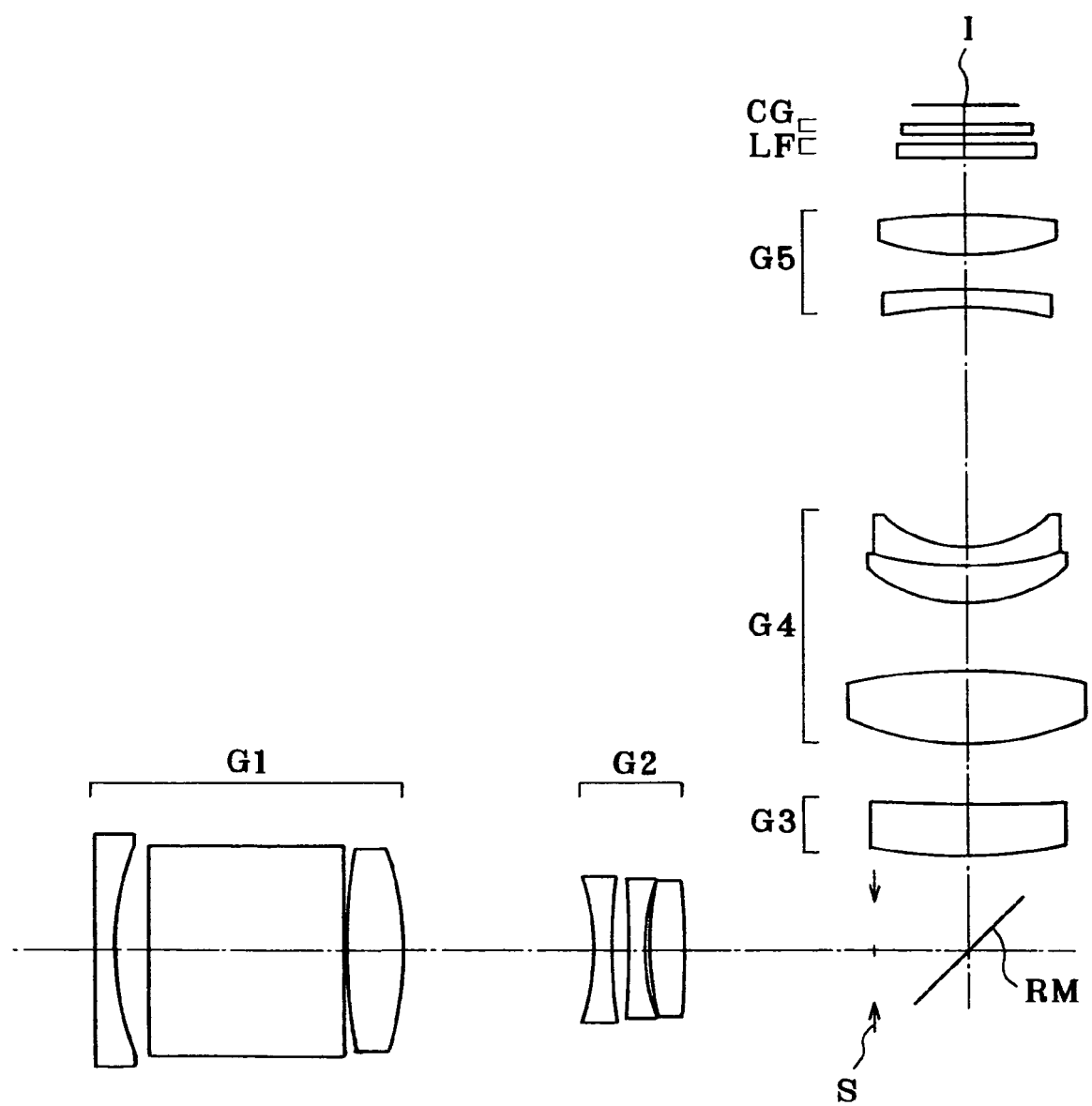
FIG. 2 is illustrative in lens arrangement section of Example 1 in an intermediate setting upon focusing on an infinite object point.
Figure 3:
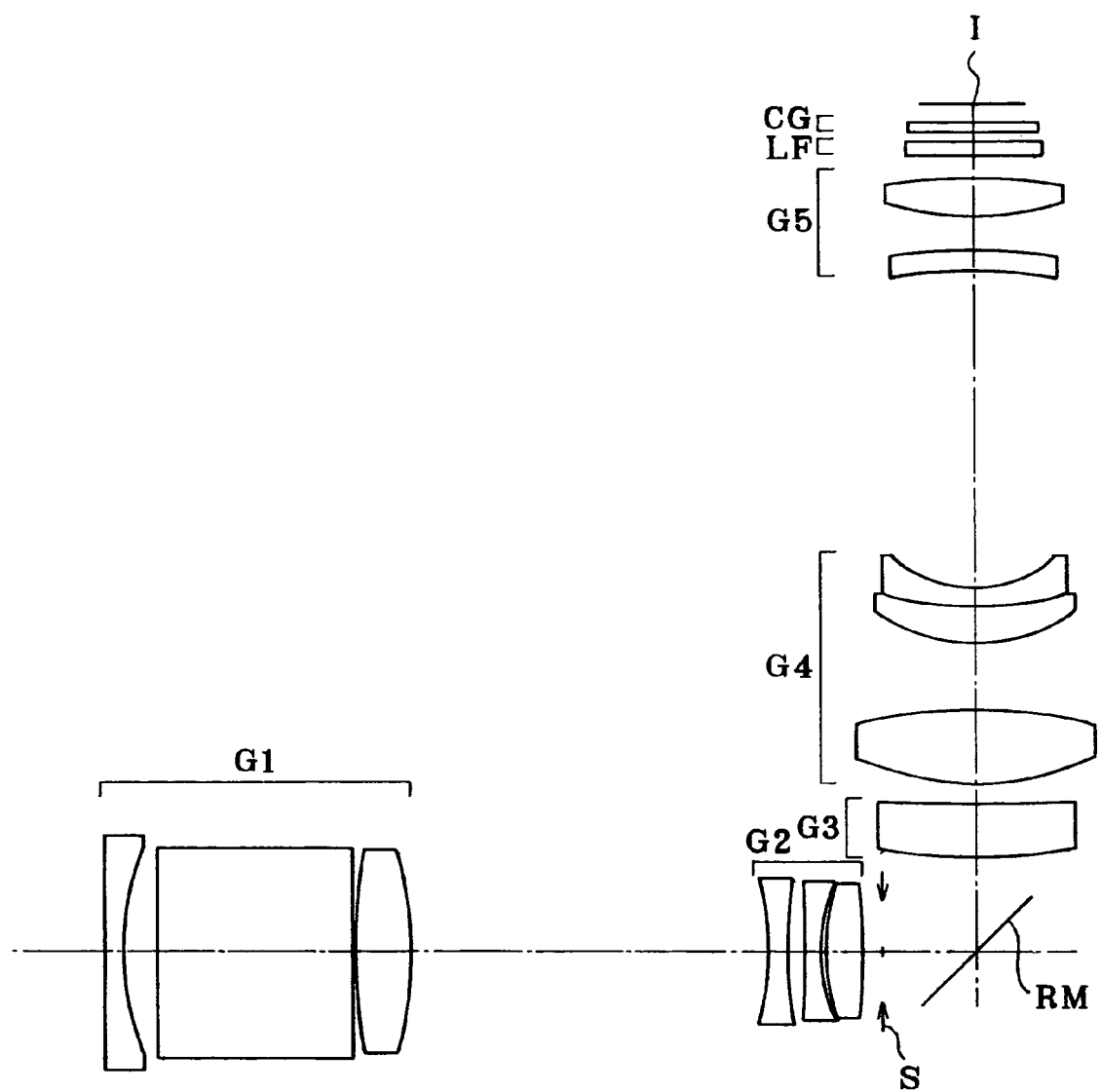
FIG. 3 is illustrative in lens arrangement section of Example 1 at the telephoto end upon focusing on an infinite object point.
Figure 4:
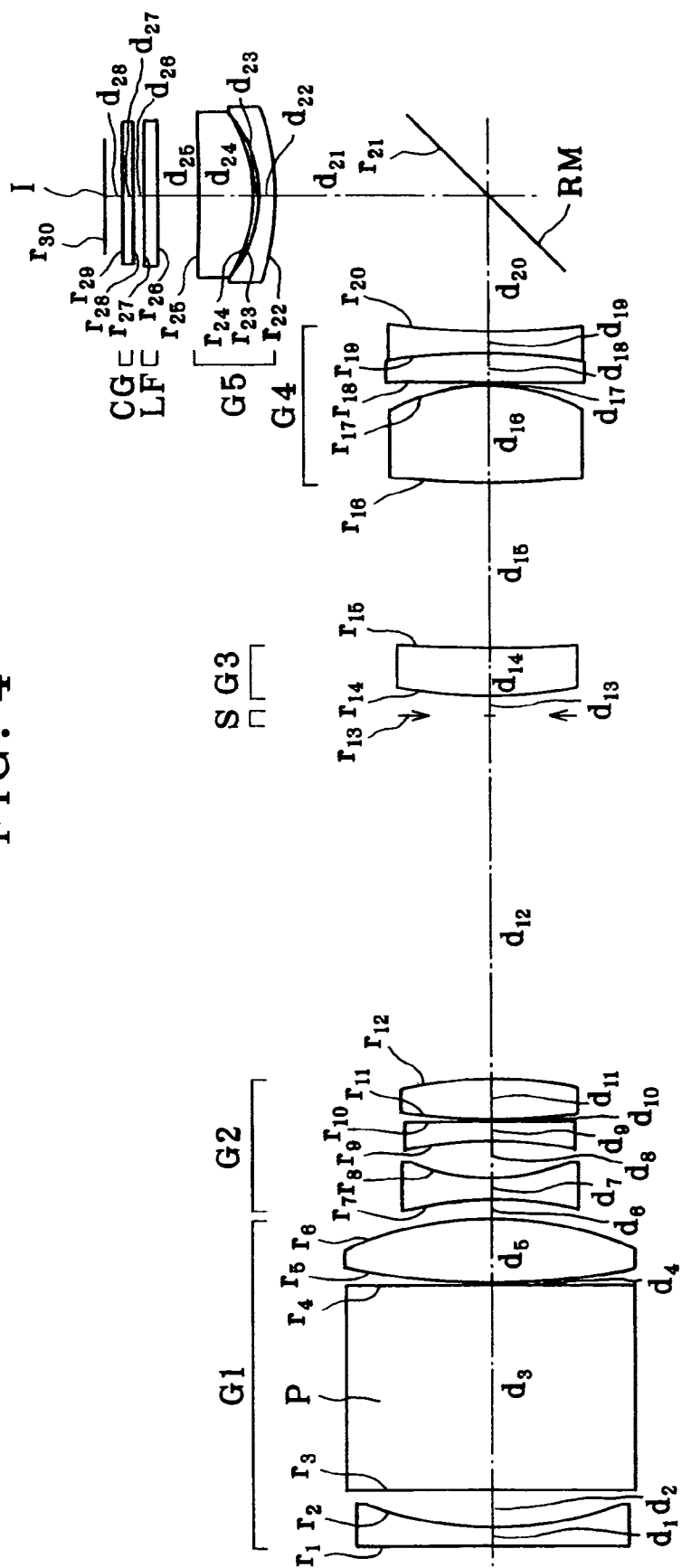
FIG. 4 is illustrative in lens arrangement section of Example 2 of the zoom lens of the invention at the wide-angle end upon focusing on an object point at infinity.
Figure 5:
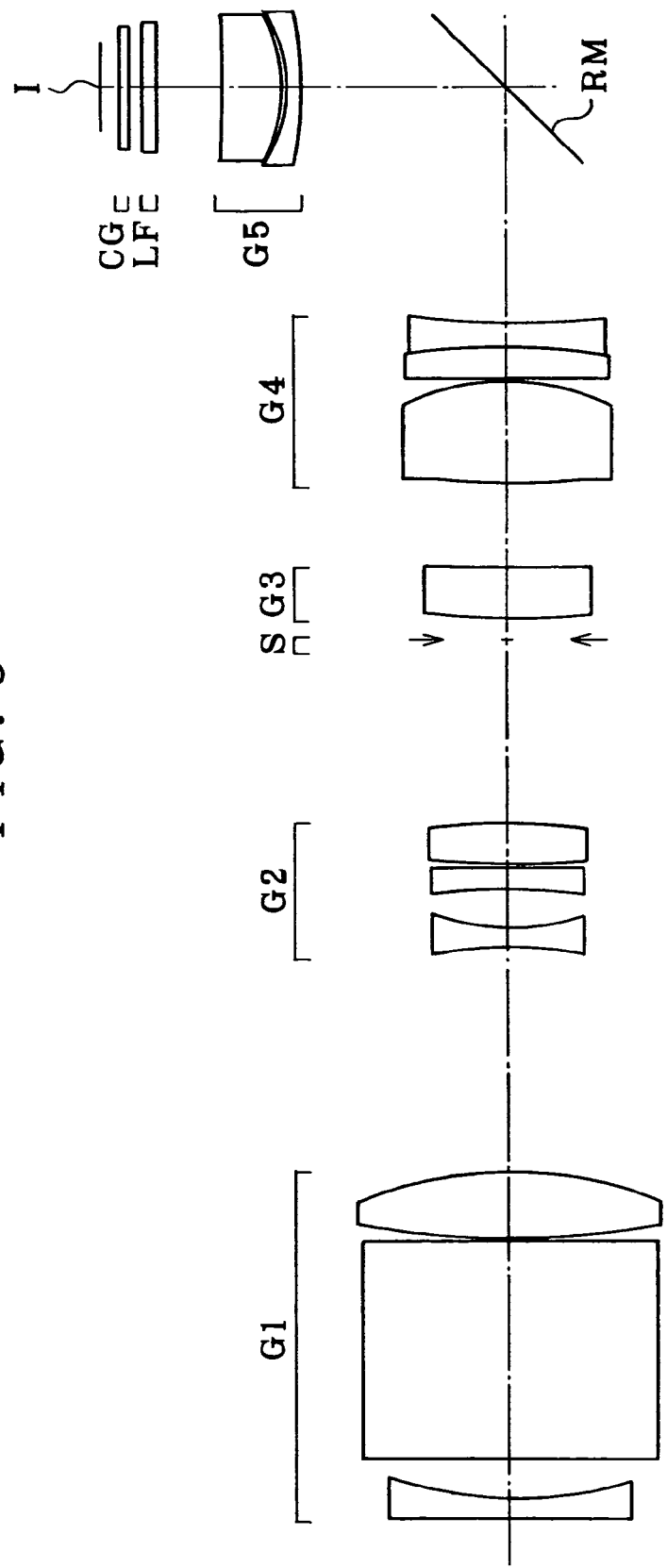
FIG. 5 is illustrative in lens arrangement section of Example 2 in an intermediate setting upon focusing on an infinite object point.
Figure 6:
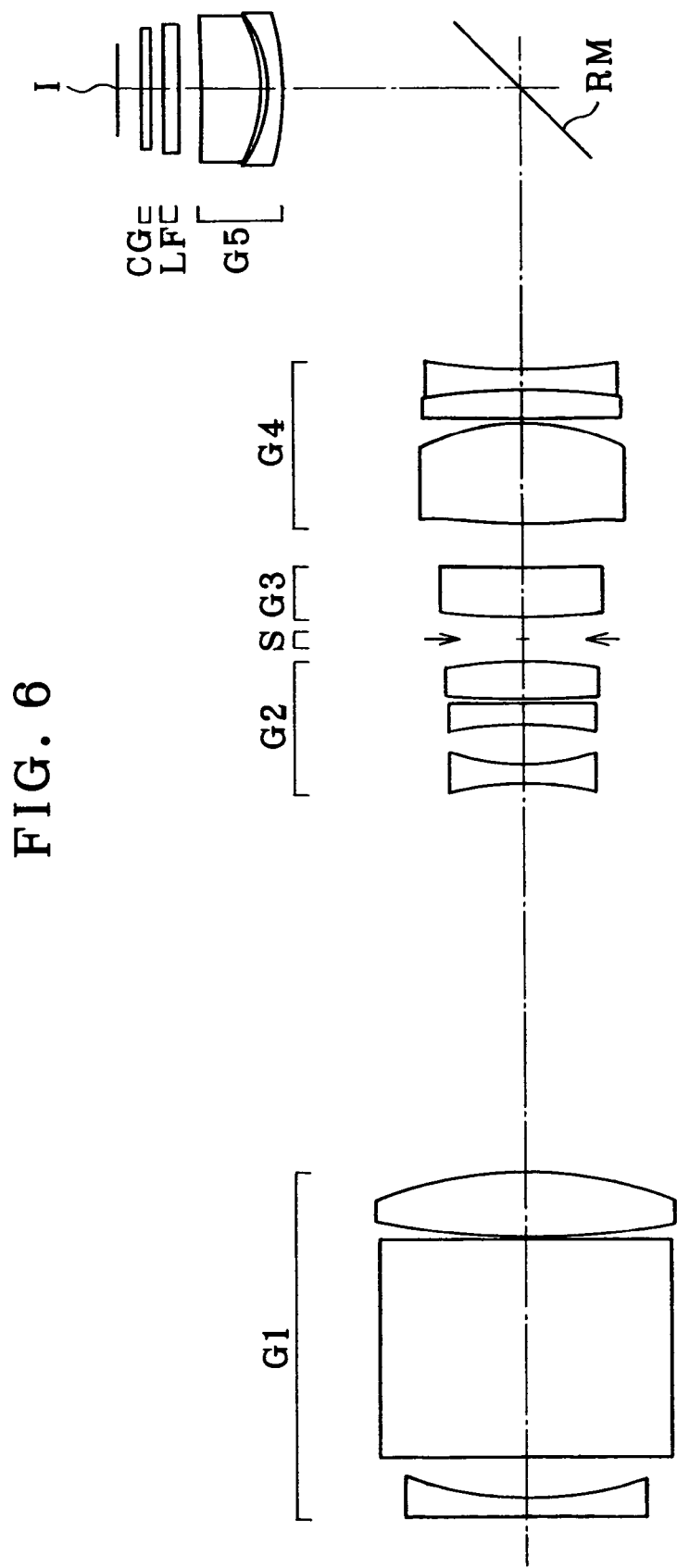
FIG. 6 is illustrative in lens arrangement section of Example 2 at the telephoto end upon focusing on an infinite object point.

The zoom lens of the invention is now explained with reference to Examples 1 and 2. FIGS. 1, 2 and 3 are illustrative in lens arrangement section of Example 1 at the wide-angle end, in an intermediate setting and at the telephoto end, respectively, upon focusing on an infinite object point. FIGS. 4, 5 and 6 are views, as in FIGS. 1, 2 and 3, but of Example 2 upon focusing on an infinite object point. Throughout FIGS. 1 to 6, G1 stands for the first lens group, G2 the second lens group, S a stop, G3 the third lens group, G4 the fourth lens group, G5 the fifth lens group, RM a mirror (plane mirror) as the second reflecting optical member, LF an optical low-pass filter, CG is a cover glass for a CCD that is an electronic image pickup device, and I the image plane of CCD. It is noted that an optical path bending prism as the first reflecting optical member located in the first lens group G1 is shown in the form of a plane-parallel plate P with taken-apart optical paths, and no reflecting surface is given. A near infrared sharp cut coating, for instance, could be applied directly onto the optical low-pass filter LF, or there could be applied separately an infrared cut absorption filter. Alternatively, a near infrared sharp cut coating could be applied onto the entrance surface of a transparent flat plate.

EXAMPLE 1

As shown in FIGS. 1, 2 and 3, this example is directed to a zoom lens made up of, in order from its object side, a first lens group G1 that has positive power and remains fixed during zooming, a second lens group G2 that has negative power and, upon zooming, moves toward the image side of the zoom lens from the wide-angle end to the telephoto end such that it is positioned nearer to the image side at the telephoto than at the wide-angle end, an aperture stop S that remains fixed during zooming, a third lens group G3 that has positive power and remains fixed during zooming, a fourth lens group G4 that has positive power and, upon zooming, moves toward the object side of the zoom lens from the wide-angle end to the telephoto end such that it is positioned nearer to the object side at the telephoto end than at the wide-angle end, and a fifth lens group G5 that has positive power and, upon zooming, moves toward the image side from the wide-angle end to the telephoto end such that it is positioned nearer to the object side at the telephoto end than at the wide-angle end. The optical path is bent in a longitudinal direction (first direction) with respect to a camera by a prism located in the first lens group G1, and is bent in a transverse direction (second direction) with respect to the camera by a fixed mirror RM interposed between the aperture stop S and the third lens group G3. This second optical path bending could be performed by a prism. Focusing is carried out by the third lens group G3, the fourth lens group G4, or the fifth lens group G5.

The first lens group G1 is composed of, in order from its object side, a negative meniscus lens convex on its object side, an optical path bending prism P and a double-convex positive lens; the second lens group G2 is composed of, in order its object side, two double-concave negative lenses and a double-convex positive lens; the third lens group G3 is composed of one positive meniscus lens convex on its object side; the fourth lens group G4 is composed of, in order from its object side, a double-convex positive lens and a doublet consisting of a positive meniscus lens convex on its object side and a negative meniscus lens convex on its object side; and the fifth lens group G5 is composed of a negative meniscus lens convex on its image side and a double-convex positive lens.

Four aspheric surfaces are used: one at the image-side surface of the negative meniscus lens in the first lens group G1, one at the image-side surface of the double-concave negative lens located in the second lens group G2 and nearest to its object side, and two at both surfaces of the double-convex positive lens in the fourth lens group G4.

EXAMPLE 2

As shown in FIGS. 4, 5 and 6, this example is directed to a zoom lens made up of, in order from its object side, a first lens group G1 that has positive power and remains fixed during zooming, a second lens group G2 that has negative power and, upon zooming, moves toward the image side of the zoom lens from the wide-angle end to the telephoto end such that it is positioned nearer to the image side at the telephoto end than at the wide-angle end, an aperture stop S that remains fixed during zooming, a third lens group G3 that has positive power and remains fixed during zooming, a fourth lens group G4 that has positive power and, upon zooming, moves toward the object side from the wide-angle end to the telephoto end such that it is positioned nearer to the object side at the telephoto end than at the wide-angle end, and a fifth lens group G5 that has positive power and, upon zooming, moves in a concave locus toward the image side from the wide-angle end to the telephoto end such that it is positioned nearer to the image side at the telephoto end than at the wide-angle end. The optical path is bent in a longitudinal direction (first direction) with respect to a camera by a prism located in the first lens group G1, and is bent in a transverse direction (second direction) with respect to the camera by a fixed mirror RM interposed between the fourth lens group G4 and the fifth lens group G5. The second optical path bending could be performed by a prism. Focusing is carried out by the third lens group G3, the fourth lens group G4, or the fifth lens group G5.

The first lens group G1 is composed of, in order from its object side, a negative meniscus lens convex on its object side, an optical path bending prism P and a double-convex positive lens; the second lens group G2 is composed of, in order from its object side, two double-concave negative lenses and a double-convex positive lens; the third lens group G3 is composed of one positive meniscus lens convex on its object side; the fourth lens group G4 is composed of, in order from its object side, a double-convex positive lens and a doublet consisting of a double-convex positive lens and a double-concave negative lens; and the fifth lens group G5 is composed of, in order from its object side, a negative meniscus lens convex on its object side and a double-convex positive lens.

Four aspheric surfaces are used: one at the image-side surface of the negative meniscus lens in the first lens group G1, one at the image-side surface of the double-concave negative lens located in the second lens group G2 and nearest to its object side, and two at both surfaces of the double-convex positive lens in the fourth lens group G4.

Numerical data about each of Examples 1 and 2 are enumerated below. The symbols used hereinafter but not hereinbefore have the following meanings.

f: focal length of the zoom lens,
$F_{NO}$: F-number,
WE: wide-angle end,
ST: intermediate setting,
TE: telephoto end, $r_1, r_2 \ldots$ : radius of curvature of each lens surface,
$d_1, d_2 \ldots$ : space between adjacent lens surfaces,
$n_{d1}, n_{d2} \ldots$ : d-line refractive index of each lens, and
$v_{d1}, v_{d2} \ldots$ : Abbe constant of each lens.

Here let x be an optical axis provided that the direction of propagation of light is positive and y be a direction orthogonal to the optical axis. Then, aspheric shape is given by $$x=(y^2/r)/[1+\{1-(K+1)(y/r)^2\}^{1/2}]+A_4y^4+A_6y^6+A_8y^8+A_{10}y^{10}$$

where r is a paraxial radius of curvature, K is a conical coefficient, and $A_4$, $A_6$, $A_8$ and $A_{10}$ are the $4^{th}$-, $6^{th}$-, $8^{th}$-, and $10^{th}$-order aspheric coefficients, respectively.

EXAMPLE 1

| | | | |
|---|---|---|---|
| $r_1 = 443.279$ | $d_1 = 1.00$ | $n_{d1} = 1.84666$ | $v_{d1} = 23.78$ |
| $r_2 = 16.898$ (Aspheric) | $d_2 = 1.80$ | | |
| $r_3 = \infty$ | $d_3 = 10.40$ | $n_{d2} = 1.83400$ | $v_{d2} = 37.16$ |
| $r_4 = \infty$ | $d_4 = 0.10$ | | |
| $r_5 = 38.693$ | $d_5 = 3.00$ | $n_{d3} = 1.74320$ | $v_{d3} = 49.34$ |
| $r_6 = -19.138$ | $d_6 =$ (Variable) | | |
| $r_7 = -15.765$ | $d_7 = 1.00$ | $n_{d4} = 1.80610$ | $v_{d4} = 40.71$ |
| $r_8 = 22.393$ (Aspheric) | $d_8 = 0.84$ | | |
| $r_9 = -201.091$ | $d_9 = 1.00$ | $n_{d5} = 1.80610$ | $v_{d5} = 40.92$ |
| $r_{10} = 11.885$ | $d_{10} = 0.15$ | | |
| $r_{11} = 14.116$ | $d_{11} = 1.99$ | $n_{d6} = 1.84666$ | $v_{d6} = 23.78$ |
| $r_{12} = -40.776$ | $d_{12} =$ (Variable) | | |
| $r_{13} = \infty$ (Stop) | $d_{13} = 5.00$ | | |
| $r_{14} = \infty$ (Reflective surface) | $d_{14} = 5.00$ | | |
| $r_{15} = 24.015$ | $d_{15} = 3.00$ | $n_{d7} = 1.48749$ | $v_{d7} = 70.23$ |
| $r_{16} = 122.275$ | $d_{16} =$ (Variable) | | |
| $r_{17} = 13.611$ (Aspheric) | $d_{17} = 4.00$ | $n_{d8} = 1.48749$ | $v_{d8} = 70.23$ |
| $r_{18} = -33.003$ (Aspheric) | $d_{18} = 3.79$ | | |
| $r_{19} = 8.449$ | $d_{19} = 2.00$ | $n_{d9} = 1.43875$ | $v_{d9} = 94.93$ |
| $r_{20} = 18.766$ | $d_{20} = 1.10$ | $n_{d10} = 1.80518$ | $v_{d10} = 25.43$ |
| $r_{21} = 6.561$ | $d_{21} =$ (Variable) | | |
| $r_{22} = -22.273$ | $d_{22} = 1.07$ | $n_{d11} = 1.84666$ | $v_{d11} = 23.78$ |
| $r_{23} = -38.737$ | $d_{23} = 1.81$ | | |
| $r_{24} = 15.731$ | $d_{24} = 2.20$ | $n_{d12} = 1.49700$ | $v_{d12} = 81.54$ |
| $r_{25} = -27.349$ | $d_{25} =$ (Variable) | | |
| $r_{26} = \infty$ | $d_{26} = 0.76$ | $n_{d13} = 1.54771$ | $v_{d13} = 62.84$ |
| $r_{27} = \infty$ | $d_{27} = 0.55$ | | |
| $r_{28} = \infty$ | $d_{28} = 0.50$ | $n_{d14} = 1.51633$ | $v_{d14} = 64.14$ |
| $r_{29} = \infty$ | $d_{29} = 1.00$ | | |
| $r_{30} = \infty$ (Image plane) | | | |

Aspherical Coefficients

2nd surface

K = 0.926
$A_4 = 3.65999 \times 10^{-5}$
$A_6 = -1.59844 \times 10^{-7}$
$A_8 = 1.04955 \times 10^{-8}$
$A_{10} = -1.31398 \times 10^{-10}$ 8th surface K = −2.087
$A_4 = -1.70092 \times 10^{-4}$
$A_6 = -3.06972 \times 10^{-7}$
$A_8 = -2.40346 \times 10^{-8}$
$A_{10} = 7.41918 \times 10^{-10}$ 17th surface K = −0.310
$A_4 = -5.25541 \times 10^{-5}$
$A_6 = -7.81138 \times 10^{-7}$
$A_8 = -1.09903 \times 10^{-8}$
$A_{10} = 0$ -continued

18th surface

K = 0.000
$A_4 = 1.68767 \times 10^{-5}$
$A_6 = -1.18091 \times 10^{-6}$
$A_8 = -1.08603 \times 10^{-8}$
$A_{10} = 1.35500 \times 10^{-10}$ Zooming Data (∞)

|  | WE | ST | TE |
|---|---|---|---|
| f (mm) | 6.460 | 14.440 | 31.000 |
| $F_{NO}$ | 3.60 | 4.82 | 5.53 |
| $d_6$ | 1.00 | 9.77 | 18.67 |
| $d_{12}$ | 18.67 | 9.90 | 1.00 |
| $d_{16}$ | 9.65 | 3.17 | 1.00 |
| $d_{21}$ | 2.50 | 12.95 | 17.27 |
| $d_{25}$ | 7.07 | 3.10 | 0.94 |

EXAMPLE 2

| $r_1 = 9484.771$ | $d_1 = 1.00$ | $n_{d1} = 1.84666$ | $v_{d1} = 23.78$ |
|---|---|---|---|
| $r_2 = 21.472$ (Aspheric) | $d_2 = 1.80$ | | |
| $r_3 = \infty$ | $d_3 = 10.40$ | $n_{d2} = 1.83400$ | $v_{d2} = 37.16$ |
| $r_4 = \infty$ | $d_4 = 0.10$ | | |
| $r_5 = 41.426$ | $d_5 = 3.18$ | $n_{d3} = 1.74320$ | $v_{d3} = 49.34$ |
| $r_6 = -18.992$ | $d_6 = $ (Variable) | | |
| $r_7 = -18.723$ | $d_7 = 1.00$ | $n_{d4} = 1.80610$ | $v_{d4} = 40.71$ |
| $r_8 = 9.372$ (Aspheric) | $d_8 = 1.91$ | | |
| $r_9 = -20.685$ | $d_9 = 1.07$ | $n_{d5} = 1.80610$ | $v_{d5} = 40.92$ |
| $r_{10} = 635.707$ | $d_{10} = 0.10$ | | |
| $r_{11} = 39.589$ | $d_{11} = 2.06$ | $n_{d6} = 1.84666$ | $v_{d6} = 23.78$ |
| $r_{12} = -21.780$ | $d_{12} = $ (Variable) | | |
| $r_{13} = \infty$ (Stop) | $d_{13} = 1.01$ | | |
| $r_{14} = 28.468$ | $d_{14} = 2.52$ | $n_{d7} = 1.80610$ | $v_{d7} = 40.92$ |
| $r_{15} = 118.663$ | $d_{15} = $ (Variable) | | |
| $r_{16} = 28.871$ (Aspheric) | $d_{16} = 5.00$ | $n_{d8} = 1.48749$ | $v_{d8} = 70.23$ |
| $r_{17} = -11.414$ (Aspheric) | $d_{17} = 0.10$ | | |
| $r_{18} = 1849.026$ | $d_{18} = 1.48$ | $n_{d9} = 1.72916$ | $v_{d9} = 54.68$ |
| $r_{19} = -33.641$ | $d_{19} = 1.10$ | $n_{d10} = 1.80518$ | $v_{d10} = 25.43$ |
| $r_{20} = 35.506$ | $d_{20} = $ (Variable) | | |
| $r_{21} = \infty$ (Reflective surface) | $d_{21} = $ (Variable) | | |
| $r_{22} = 14.028$ | $d_{22} = 0.80$ | $n_{d11} = 1.84666$ | $v_{d11} = 23.78$ |
| $r_{23} = 6.567$ | $d_{23} = 0.16$ | | |
| $r_{24} = 6.982$ | $d_{24} = 2.90$ | $n_{d12} = 1.72916$ | $v_{d12} = 54.68$ |
| $r_{25} = 93.363$ | $d_{25} = $ (Variable) | | |
| $r_{26} = \infty$ | $d_{26} = 0.76$ | $n_{d13} = 1.54771$ | $v_{d13} = 62.84$ |
| $r_{27} = \infty$ | $d_{27} = 0.55$ | | |
| $r_{28} = \infty$ | $d_{28} = 0.50$ | $n_{d14} = 1.51633$ | $v_{d14} = 64.14$ |
| $r_{29} = \infty$ | $d_{29} = 1.00$ | | |
| $r_{30} = \infty$ (Image plane) | | | |

Aspherical Coefficients

2nd surface

K = 1.748
$A_4 = 5.42850 \times 10^{-5}$
$A_6 = 1.60485 \times 10^{-7}$
$A_8 = 5.72772 \times 10^{-10}$
$A_{10} = 1.54234 \times 10^{-11}$

8th surface

K = −0.769
$A_4 = -1.73713 \times 10^{-4}$
$A_6 = 1.43381 \times 10^{-6}$
$A_8 = -6.28482 \times 10^{-8}$
$A_{10} = 1.23906 \times 10^{-9}$ -continued

16th surface

K = −10.741
$A_4 = -2.36898 \times 10^{-4}$
$A_6 = -2.98324 \times 10^{-6}$
$A_8 = -1.16695 \times 10^{-7}$
$A_{10} = 0$

17th surface

K = 0.000
$A_4 = -8.67559 \times 10^{-5}$
$A_6 = -1.50524 \times 10^{-6}$
$A_8 = -9.02808 \times 10^{-8}$
$A_{10} = 8.16542 \times 10^{-10}$ Zooming Data (∞)

|  | WE | ST | TE |
|---|---|---|---|
| f (mm) | 6.460 | 13.870 | 31.001 |
| $F_{NO}$ | 3.64 | 3.99 | 4.43 |
| $d_6$ | 1.00 | 10.93 | 18.86 |
| $d_{12}$ | 18.86 | 8.94 | 1.00 |
| $d_{15}$ | 8.44 | 4.11 | 2.07 |
| $d_{20}$ | 6.80 | 11.13 | 13.07 |
| $d_{21}$ | 10.49 | 9.60 | 11.40 |
| $d_{25}$ | 1.91 | 2.80 | 1.10 |

Figure 7A:
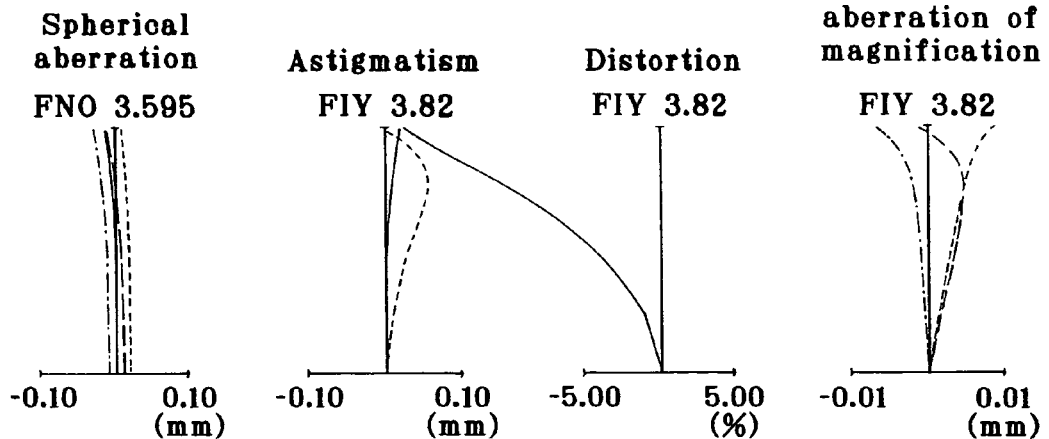
FIGS. 7(A), 7(B) and 7(C) are aberration diagrams indicative of spherical aberration, astigmatism, distortion and chromatic aberration of magnification at the wide-angle end, in an intermediate setting, and at the telephoto end of Example 1 upon focusing on an object point at infinity.
Figure 7B:
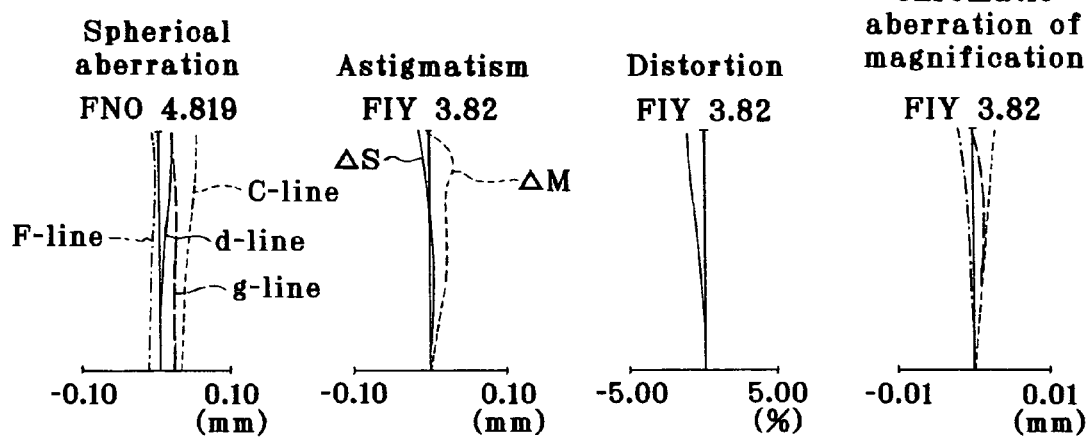
Figure 7C:
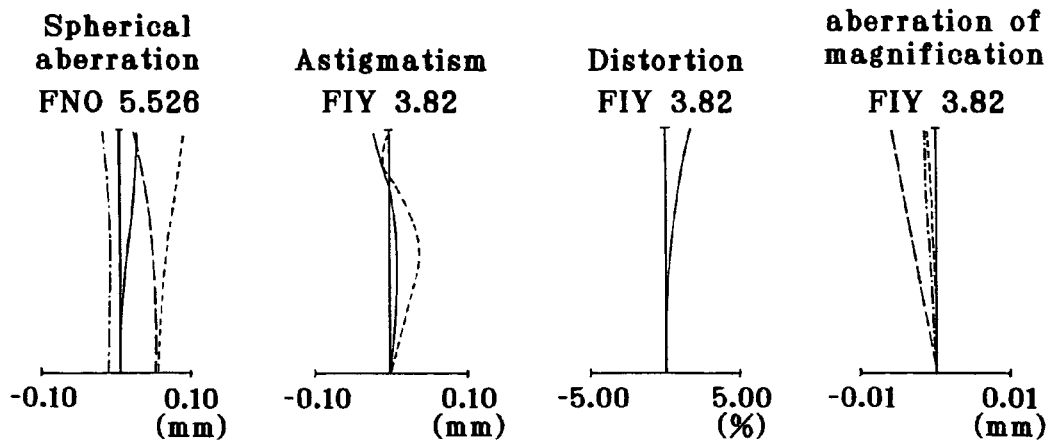
Figure 8A:
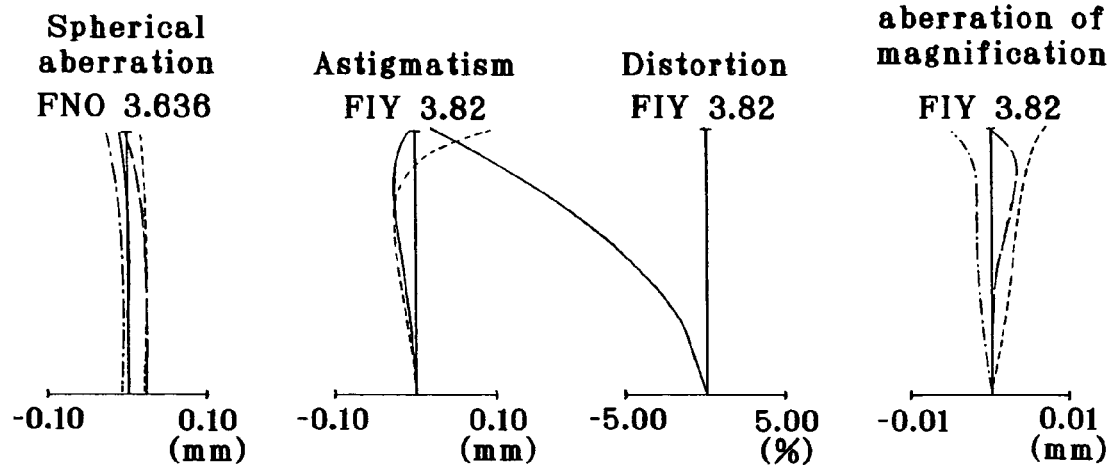
FIGS. 8(A), 8(B) and 8(C) are aberration diagrams, as in FIGS. 7(A), 7(B) and 7(C), but of Example 2.
Figure 8B:
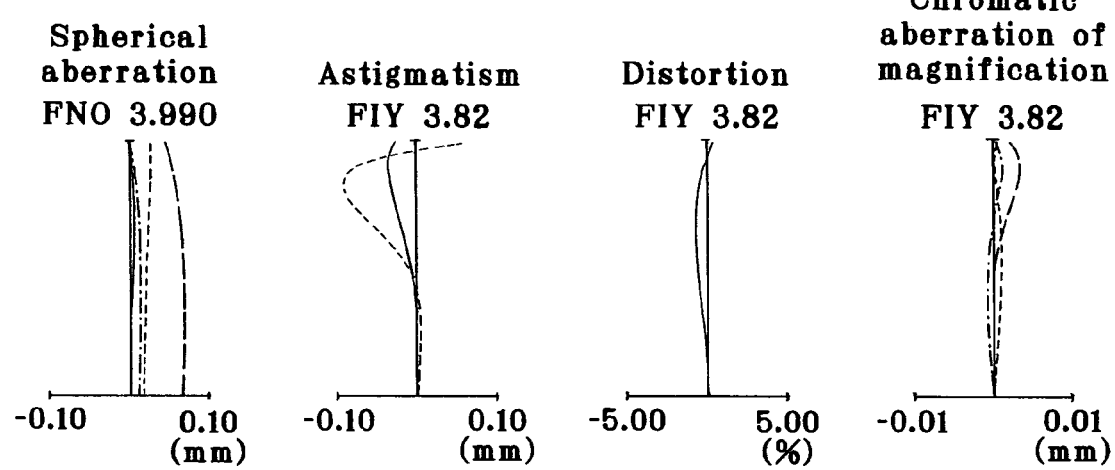
Figure 8C:
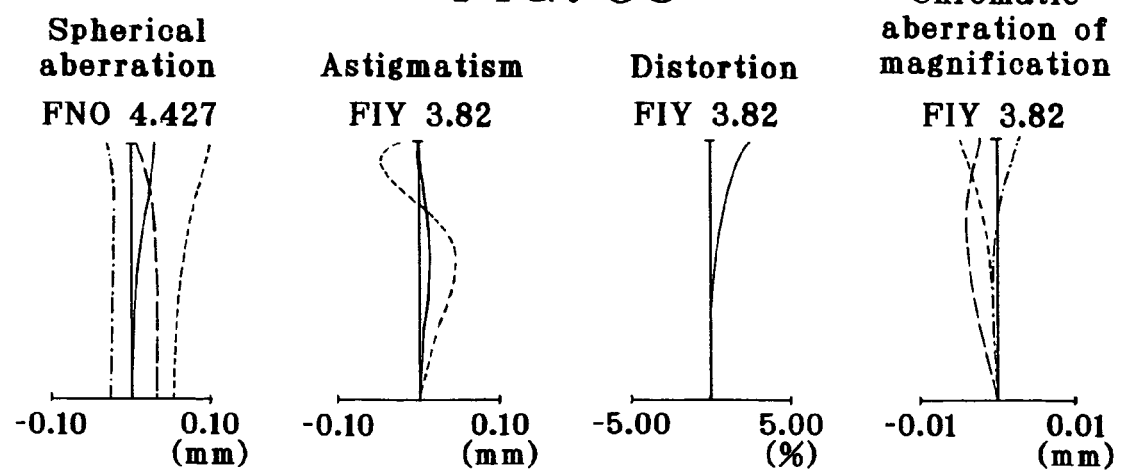

FIGS. 7A, 7B and 7C are aberration diagrams illustrative of spherical aberration, astigmatism, distortion and chromatic aberration of magnification at the wide-angle end, in an intermediate setting and at the telephoto end, respectively, of Example 1 upon focusing on an infinite object point. Similar aberrations for Example 2 are shown in FIGS. 8A, 8B and 8C. In each aberration diagram, "FIY" is indicative of a maximum image height.

The values of conditions (1) to (12) in each of Examples 1 and 2 are given below.

| Condition | Example 1 | Example 2 |
|---|---|---|
| (1) | 1.70 | 2.68 |
| (2) | 2.11 | 1.69 |
| (3) | 4.82 | 4.28 |
| (4) | 0.92 | 0.93 |
| (5) | 1.47 | 1.80 |
| (6) | 1.25 | 1.27 |
| (7) | 4.77 | 4.32 |
| (8) | 2.55 | 3.16 |
| (9) | 2.70 | 3.97 |
| (10) | 4.28 | 5.09 |
| (11) | 0.89 | 1.06 |
| (12) | 4.80 | 4.80 |

Figure 9:
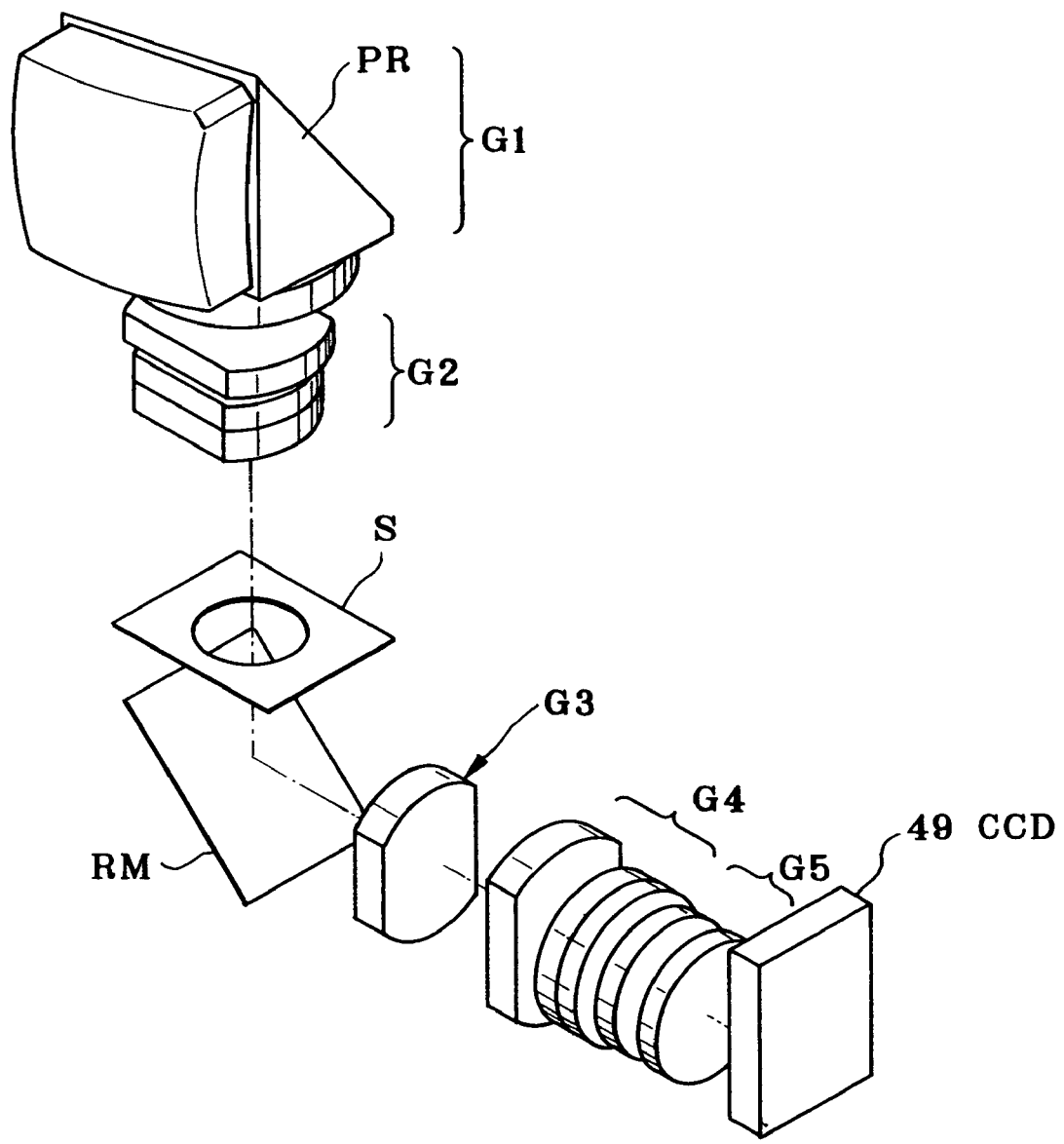
FIG. 9 is illustrative in perspective of the zoom lens according to Example 1, showing an example of how to bend the optical path.

The zoom lens of the invention as described above is used in combination with, for instance, a CCD 49 for picking up an oblong rectangular screen having a long side in the horizontal direction, which is located on an image plane I as an electronic image pickup device. As can be seen from FIG. 9 that is a perspective view of Example 1, the optical path is bent by a right-angle prism P located in the first lens group G1 in a short-side (longitudinal) direction of CCD 49, and then by a mirror (plane mirror) RM (or a right-angle prism) interposed between the second lens group G2 and the third lens group G3 in a long-side (transverse) direction. Alternatively, the optical path could be bent by the right-angle prism PR in the long-side (transverse) direction and then by the mirror (plane mirror) RM (or a right-angle prism) in the short-side (longitudinal) direction.

The zoom lens of the invention may have applications to an electronic imaging system in which an object image formed by a zoom lens is received at a CCD or other electronic image pickup device for taking purposes, especially a digital camera, a video camera or the like, as embodied below.

Figure 10:
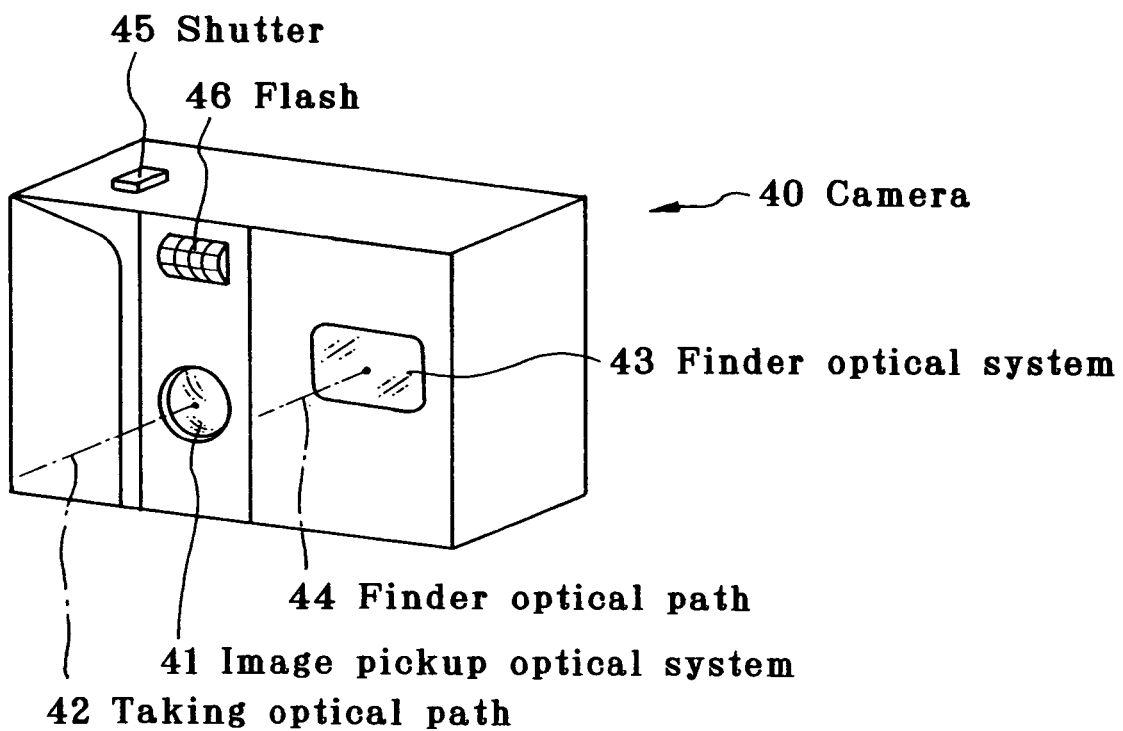
FIG. 10 is a front perspective schematic illustrative of the appearance of a digital camera with the inventive optical path-bent zoom lens built therein.
Figure 11:
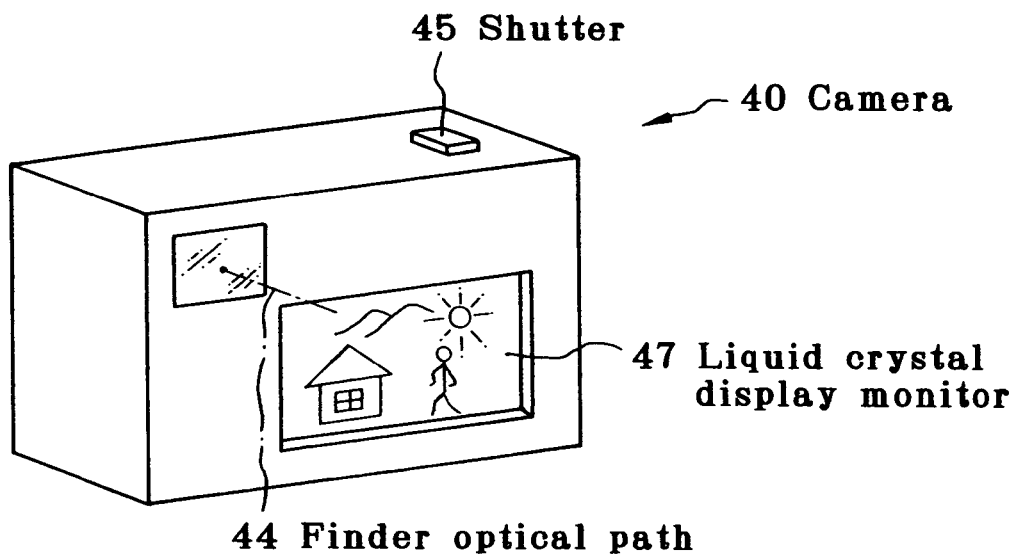
FIG. 11 is a rear perspective schematic of the digital camera of FIG. 10.
Figure 12:
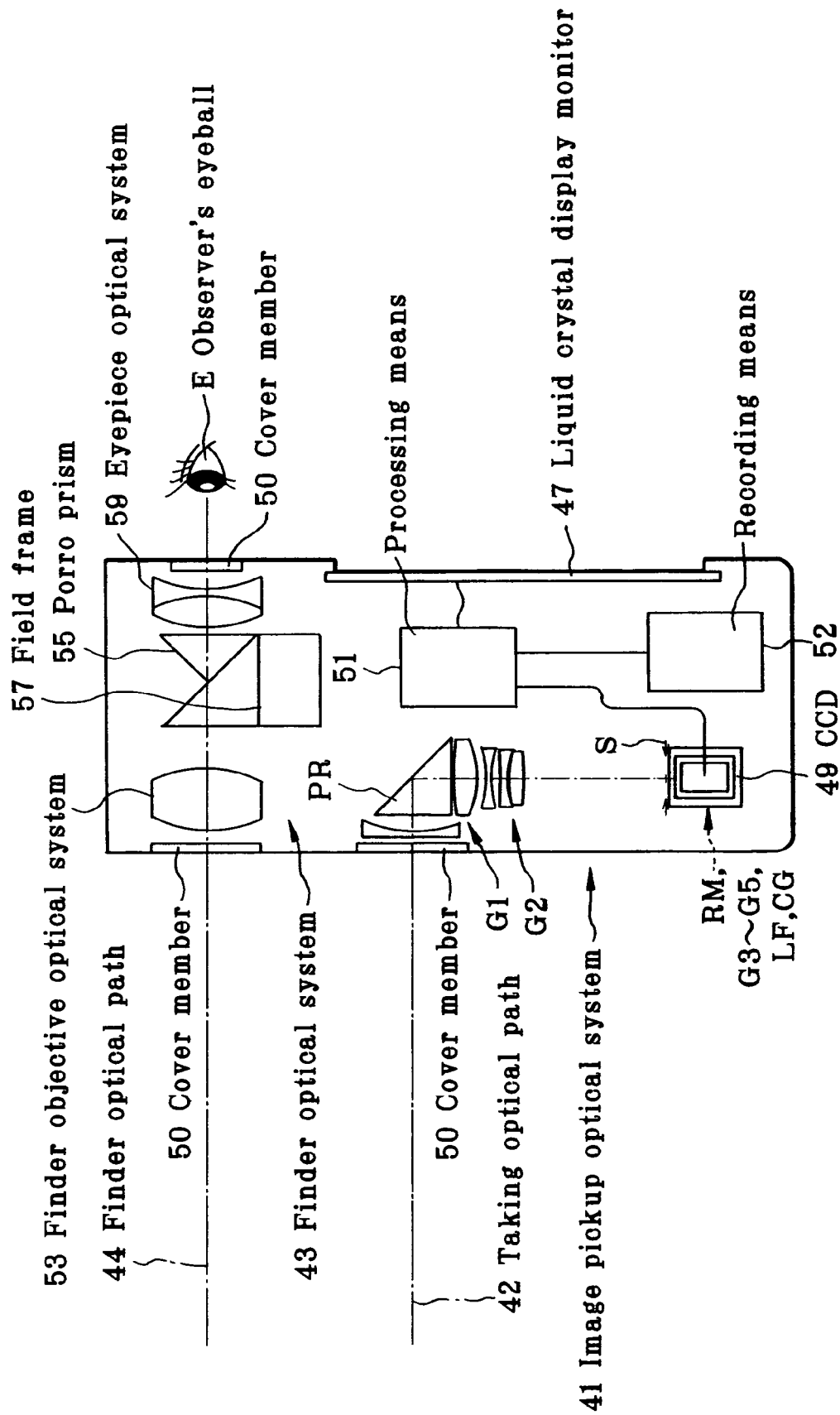
FIG. 12 is a sectional schematic of the digital camera of FIG. 10.

FIGS. 10, 11 and 12 are conceptual illustrations of a taking optical system 41 for digital cameras, in which the zoom lens of the invention is incorporated. FIG. 10 is a front perspective view of the appearance of a digital camera 40, and FIG. 11 is a rear perspective view of the same. FIG. 12 is a sectional view of the construction of the digital camera 40. In this embodiment, the digital camera 40 comprises a taking optical system 41 including a taking optical path 42, a finder optical system 43 including a finder optical path 44, a shutter 45, a flash 46, a liquid crystal monitor 47 and so on. As the shutter 45 mounted on the upper portion of the camera 40 is pressed down, it causes an image to be taken through the taking optical system 41, for instance, the optical path-bending zoom lens of Example 1. An object image formed by the taking optical system 41 is formed on the image pickup plane of a CCD 49 via a near infrared cut filter and an optical low-pass filter LF. Referring here to FIG. 12, the optical path is bent by the mirror RM frontward of the paper sheet such that the mirror RM, the third to fifth lens groups G3 to G5, the low-pass filter LF and the CCG's cover glass are hidden behind CCD 49. An object image received at CCD 49 is shown as an electronic image on the liquid crystal monitor 47 via processing means 51, which monitor is mounted on the back of the camera. This processing means 51 is connected with recording means 52 in which the taken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera could also be constructed in the form of a silver-halide camera using a silver-halide film in place of CCD 49.

Moreover, a finder objective optical system 53 is located on the finder optical path 44. An object image formed by the finder objective optical system 53 is in turn formed on the field frame 57 of a Porro prism 55 that is an image-erecting member. In the rear of the Porro prism 55 there is located an eyepiece optical system 59 for guiding an erected image into the eyeball E of an observer. It is here noted that cover members 50 are provided on the entrance sides of the taking optical system 41 and finder objective optical system 53 as well as on the exit side of the eyepiece optical system 59.

With the thus constructed digital camera 40, it is possible to achieve high performance and much more thickness reductions in its depth direction, because the taking optical system 41 is a zoom lens having a zoom ratio of as high as about 5 and an improved optical performance.

In the embodiment of FIG. 12, plane-parallel plates are used as the cover members 50; however, it is acceptable to leave them out or use powered lenses.

I claim:

1. A zoom lens having a plurality of lens groups, comprising:
    a lens group F located nearest to an object side thereof;
    a first reflecting optical member for bending an optical path to a first direction located in said lens group F; and
    a second reflecting optical member for bending the optical path to a second direction which is different from the first direction, the second reflecting optical member being located on an image side with respect to said lens group F,
    wherein said lens group F remains substantially fixed with respect to an image plane during zooming, and
    wherein said lens group F comprises, in order from an object side thereof, a negative lens component, the first reflecting optical member and a positive lens component, and
    wherein in said lens group F, a total number of lens components except the first reflecting optical member is 2, and the lens group F has an aspherical lens surface.

2. The zoom lens according to claim 1, which satisfies the following condition (1):

$$1.0 < D/f_w < 4.0 \tag{1}$$

where D is an air space at which a space between a lens group just on an object side of the second reflecting optical member and a lens group on an image side of the second reflecting optical member becomes the narrowest, and
$f_w$ is a focal length of the zoom lens at a wide-angle end thereof.

3. The zoom lens according to claim 1, further comprising: a lens group VF having negative power located on an image side with respect to said lens group F and moving in such a way as to be positioned nearer to the image side at a telephoto end than at a wide-angle end of the zoom lens upon zooming; a lens group VR having positive power located on an image side with respect to said lens group VF and moving in such a way as to be positioned nearer to the object side at the telephoto end than at the wide-angle end upon zooming; and an aperture stop positioned between said lens group VF and said lens group VR, and which satisfies the following conditions (2) and (3):

$$0.8 < |f_2/f_w| < 4.0 \tag{2}$$

$$0.8 < |f_4/f_w| < 6.0 \tag{3}$$

where $f_2$ is a focal length of the lens group VF,
$f_4$ is a focal length of the lens group VR, and
$f_w$ is a focal length of the zoom lens at the wide-angle end.

4. The zoom lens according to claim 3, further comprising a lens group R having positive or negative power located on an image side with respect to said lens group VR.

5. The zoom lens according to claim 4, which satisfies the following conditions (10) and (11):

$$0.6 < |f_5/f_w| < 20 \tag{10}$$

$$0.1 < |f_5/f_t| < 6.0 \tag{11}$$

where $f_5$ is a focal length of the lens group R,
$f_w$ is a focal length of the zoom lens at the wide-angle end, and
$f_t$ is a focal length of the zoom lens at the telephoto end.

6. The zoom lens according to claim 3, wherein a lens group M having positive power is located between said lens group VF and said lens group VR.

7. The zoom lens according to claim 6, wherein said lens group M is composed of one positive lens component.

8. The zoom lens according to claim 6, wherein said lens group M is composed of a positive single lens in a meniscus form convex on an object side thereof.

9. The zoom lens according to claim 3, which satisfies the following conditions (8) and (9):

$$1.2 < \beta_{VF} < 6.5 \tag{8}$$

$$1.2 < \beta_{VR} < 6.5 \tag{9}$$

Here $\beta_{VF}$ is represented as (magnification of the lens group VF at the telephoto end)/(magnification of the lens group VF at the wide-angle end), and
$\beta_{VR}$ is represented as (magnification of the lens group VR at the telephoto end)/(magnification of the lens group VR at the wide-angle end).

10. The zoom lens according to claim 3, wherein said lens group VF is composed of two negative lens components and one positive lens component.

11. The zoom lens according to claim 1, wherein said lens group F satisfies the following conditions (5) and (6):

$$0.8 < |f_{1n}/\sqrt{(f_w \times f_t)}| < 3.0 \tag{5}$$

$$0.8 < |f_{1p}/\sqrt{(f_w \times f_t)}| < 3.0 \tag{6}$$

where $f_{1n}$ is a focal length of the negative lens component in the lens group F,
$f_{1p}$ is a focal length of the positive lens component in the lens group F,
$f_w$ is a focal length of the zoom lens at the wide-angle end, and
$f_t$ is a focal length of the zoom lens at the telephoto end.

12. The zoom lens according to claim 11, wherein the negative lens component and the positive lens component in said lens group F are each composed of a single lens.

13. The zoom lens according to claim 11, wherein an image-side surface of the negative lens component located in said lens group F is a concave surface having an aspheric surface.

14. The zoom lens according to claim 1, which satisfies the following condition (7):

$$1.5 < f_1/f_w < 7.5 \tag{7}$$

where $f_1$ is a focal length of the lens group F, and
$f_w$ is a focal length of the zoom lens at the wide-angle end.

15. The zoom lens according to claim 1, which satisfies the following condition (12):

$$3.5 < f_t/f_w < 10.0 \tag{12}$$

where $f_w$ is a focal length of the zoom lens at a wide-angle end thereof, and
$f_t$ is a focal length of the zoom lens at a telephoto end thereof.

16. The zoom lens according to claim 15, wherein a lens located nearest to an object side in said lens group VF is a double concave lens.

17. An electronic imaging system, comprising a zoom lens as recited in claim 1 and an electronic image pickup device for producing an image formed through said zoom lens as image data, wherein a shape of the image data is capable of being changed by processing the image data, and said zoom lens satisfies the following condition (4) upon focusing on a substantially infinite object point:

$$0.75 < y_{07}/(f_w \cdot \tan \omega_{07w}) < 0.97 \tag{4}$$

where $y_{10}$ is a distance from the center to the farthest point in an effective image pickup plane of the electronic image device, $y_{07}$ is represented as $y_{07} = 0.7 y_{10}$, and $\omega_{07w}$ is an angle with an optical axis in a direction of an object point corresponding to an image point formed at a position of $y_{07}$ from the center on the effective image pickup plane of the electronic image pickup device at the wide-angle end.

18. A zoom lens having a plurality of lens groups, comprising:
a lens group F located nearest to an object side thereof;
a first reflecting optical member for bending an optical path to a first direction located in said lens group F;
a second reflecting optical member for bending the optical path to a second direction which is different from the first direction, the second reflecting optical member being located on an image side with respect to said lens group F, wherein said lens group F and second reflecting optical member remain substantially fixed with respect to an image plane during zooming;
a lens group VF having negative power located on an image side with respect to said lens group F and moving in such a way as to be positioned nearer to the image side at a telephoto end than at a wide-angle end of the zoom lens upon zooming, wherein said lens group VF comprises a plurality of negative lens components and a positive lens component;
a lens group VR having positive power located on an image side with respect to said lens group VF and moving in such a way as to be positioned nearer to the object side at the telephoto end than at the wide-angle end upon zooming; and
an aperture stop positioned between said lens group VF and said lens group VR.

19. A zoom lens having a plurality of lens groups, comprising:
a lens group F located nearest to an object side thereof;
a first reflecting optical member for bending an optical path to a first direction located in said lens group F;
a second reflecting optical member for bending the optical path to a second direction which is different from the first direction, the second reflecting optical member being located on an image side with respect to said lens group F, wherein said lens group F and said second reflecting optical member remain substantially fixed with respect to an image plane during zooming;
a lens group VF having negative power located on an image side with respect to said lens group F and moving in such a way as to be positioned nearer to the image side at a telephoto end than at a wide-angle end of the zoom lens upon zooming;
a lens group VR having positive power located on an image side with respect to said lens group VF and moving in such a way as to be positioned nearer to the object side at the telephoto end than at the wide-angle end upon zooming, wherein said lens group VR comprises a plurality of positive lens and a negative lens; and
an aperture stop positioned between said lens group VF and said lens group VR.

20. An electronic imaging system, comprising a zoom lens and an electronic image pickup device for producing an image formed through said zoom lens as image data, wherein a shape of the image data is capable of being changed by processing the image data, and
said zoom lens has a plurality of lens groups comprising:
a lens group F located nearest to an object side thereof;
a first reflecting optical member for bending an optical path to a first direction located in said lens group F; and
a second reflecting optical member for bending the optical path to a second direction which is different from the first direction, the second reflecting optical member being located on an image side with respect to said lens group F,
wherein said lens group F remains substantially fixed with respect to an image plane during zooming and wherein the electronic imaging system satisfies the following condition (4) upon focusing on a substantially infinite object point:

$$0.75 < y_{07}/(f_w \cdot \tan \omega_{07w}) < 0.97 \tag{4}$$

where $y_{10}$ is a distance from the center to the farthest point in an effective image pickup plane of the electronic image device, $y_{07}$ is represented as $y_{07} = 0.7 y_{10}$, and $\omega_{07w}$ is an angle with an optical axis in a direction of an object point corresponding to an image point formed at a position of $Y_{07}$ from the center on the effective image pickup plane of the electronic image pickup device at the wide-angle end.

* * * * *

UNITED STATES PATENT AND TRADEMARK OFFICE
CERTIFICATE OF CORRECTION

PATENT NO.         : 7,593,629 B2                                            Page 1 of 1
APPLICATION NO.  : 11/235722
DATED              : September 22, 2009
INVENTOR(S)        : Tomoyuki Satori It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 852 days.

Signed and Sealed this

Twenty-first Day of September, 2010

David J. Kappos
*Director of the United States Patent and Trademark Office*